(12) United States Patent
Kurashima

(10) Patent No.: US 10,282,047 B2
(45) Date of Patent: May 7, 2019

(54) TOUCH PANEL, MANUFACTURING METHOD THEREOF, DISPLAY DEVICE, AND ELECTRONIC APPARATUS

(71) Applicant: Japan Display Inc., Tokyo (JP)

(72) Inventor: Takeshi Kurashima, Nagano (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/784,568

(22) Filed: Oct. 16, 2017

(65) Prior Publication Data

US 2018/0046280 A1 Feb. 15, 2018

Related U.S. Application Data

(63) Continuation of application No. 14/478,544, filed on Sep. 5, 2014, now Pat. No. 9,804,715, which is a
(Continued)

(30) Foreign Application Priority Data

Jan. 24, 2012 (JP) .................................. 2012-012398

(51) Int. Cl.
*G06F 3/044* (2006.01)
*H01H 11/00* (2006.01)
*G06F 3/041* (2006.01)

(52) U.S. Cl.
CPC .............. *G06F 3/044* (2013.01); *G06F 3/041* (2013.01); *H01H 11/00* (2013.01); *Y10T 29/49105* (2015.01)

(58) Field of Classification Search
None
See application file for complete search history.

(56) References Cited

U.S. PATENT DOCUMENTS 5,903,328 A * 5/1999 Greene ............... G02F 1/13336
156/304.1
6,912,025 B2 * 6/2005 Lin .................... G02F 1/133512
349/110
(Continued)

FOREIGN PATENT DOCUMENTS

JP 2011-198207 A 10/2011
JP 2013-145447 A 7/2013
WO WO-2011-052335 A1 5/2011

OTHER PUBLICATIONS

Japanese Office Action dated Mar. 3, 2015 for corresponding Japanese Application No. 2012-012398.

*Primary Examiner* — Patrick N Edouard
*Assistant Examiner* — Peijie Shen
(74) *Attorney, Agent, or Firm* — Michael Best & Friedrich LLP

(57) ABSTRACT

A touch panel includes: a wire substrate and a cover substrate joined to each other, wherein the wire substrate includes a sensor electrode; a plurality of signal wires that are electrically connected to the sensor electrode and extend along a circumference of the sensor electrode; and a first light blocking layer that covers at least a signal wire disposed closest to the sensor electrode of the plurality of signal wires, and wherein the cover substrate includes a second light blocking layer that faces a continuous region including an outer edge region of the first light blocking layer and a signal wire disposed so as to be the most distant from the sensor electrode.

7 Claims, 12 Drawing Sheets

Related U.S. Application Data continuation of application No. 13/713,438, filed on Dec. 13, 2012, now Pat. No. 8,854,328.

(56) References Cited

U.S. PATENT DOCUMENTS

| | | | | |
|---|---|---|---|---|
| 8,654,283 B2* | 2/2014 | Kinoe | ............... | G02F 1/133512 349/104 |
| 2010/0013786 A1* | 1/2010 | Nishikawa | ............ | G06F 1/1624 345/173 |
| 2010/0214232 A1* | 8/2010 | Chan | ................ | G06F 3/044 345/173 |
| 2010/0316851 A1* | 12/2010 | Hirai | ................ | G06F 3/044 428/195.1 |
| 2011/0140266 A1* | 6/2011 | Matsuo | ................ | G06F 3/044 257/735 |
| 2011/0227842 A1* | 9/2011 | Lin | ................ | G06F 3/044 345/173 |
| 2011/0261040 A1* | 10/2011 | Han | ................ | G06F 3/0418 345/207 |
| 2011/0290631 A1* | 12/2011 | Kuriki | ................ | G06F 3/044 200/600 |
| 2011/0298739 A1* | 12/2011 | Wu | ................ | G06F 3/041 345/173 |
| 2012/0001867 A1* | 1/2012 | Kawaguchi | ............. | G06F 3/044 345/174 |
| 2012/0154990 A1* | 6/2012 | Yang | ................ | G06F 3/041 361/679.01 |
| 2012/0169644 A1 | 7/2012 | Nagata et al. | | |
| 2012/0235927 A1* | 9/2012 | Ho | ................ | G06F 3/044 345/173 |
| 2013/0100047 A1* | 4/2013 | Liao | ................ | G06F 3/044 345/173 |
| 2013/0106813 A1* | 5/2013 | Hotelling | ............. | G06F 1/1626 345/207 |
| 2013/0153388 A1* | 6/2013 | Chan | ................ | G06F 3/044 200/5 R |

* cited by examiner

FIG.1A
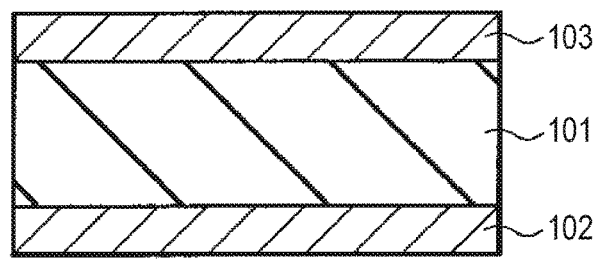
FIG.1B
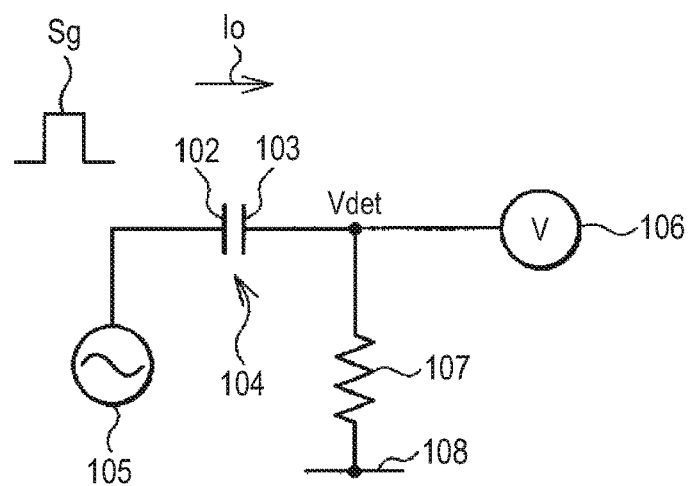
FIG.2A Vdet
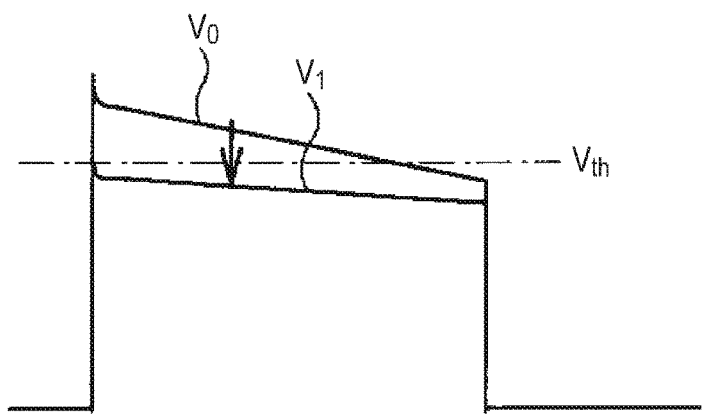
FIG.2B Sg
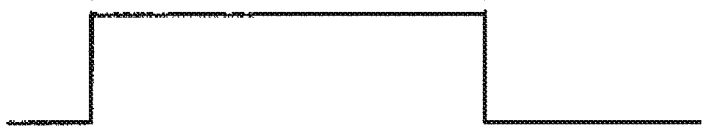

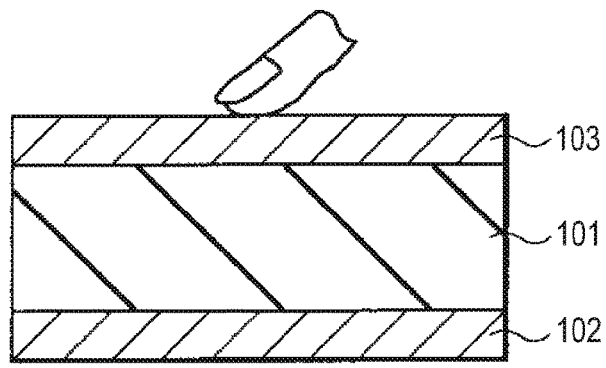
FIG.3A
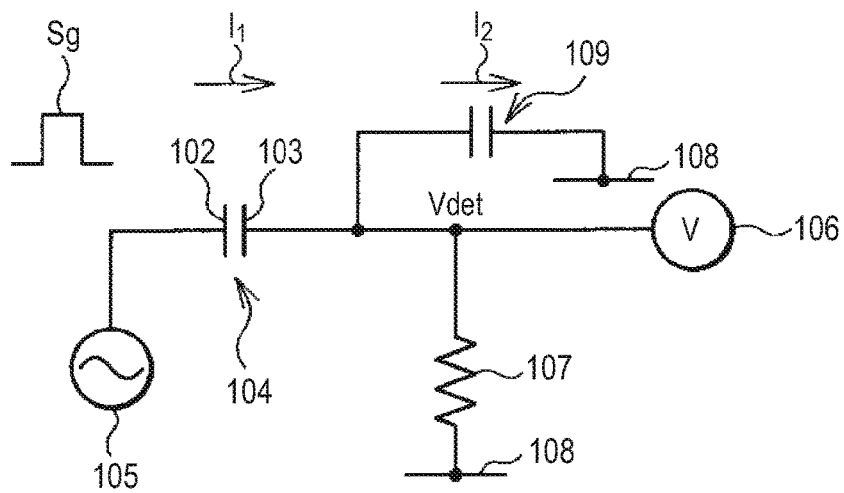
FIG.3B
FIG.4
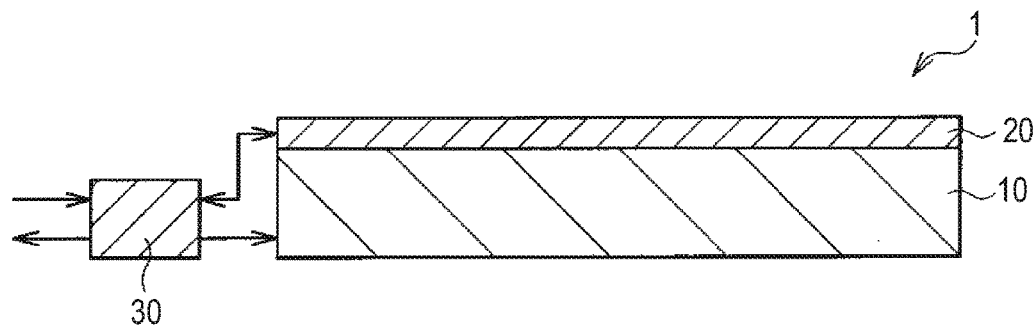

TOUCH PANEL, MANUFACTURING METHOD THEREOF, DISPLAY DEVICE, AND ELECTRONIC APPARATUS

CROSS REFERENCES TO RELATED APPLICATIONS

This Application is a Continuation Application of application Ser. No. 14/478,544, filed on Sep. 5, 2014 which is a Continuation Application of application Ser. No. 13/713,438, filed on Dec. 13, 2012, now U.S. Pat. No. 8,854,328, which claims priority from Japanese Priority Patent Application Number 2012-012398, filed in the Japan Patent Office on Jan. 24, 2012, the entire contents of which are hereby incorporated by reference.

FIELD

The present technology relates to a touch panel which enables a position at which an object (hereinafter, referred to as the "finger or the like") such as the finger, the hand, the arm, or a pen is touched on a detection surface to be detected, and a manufacturing method thereof. In addition, the present technology relates to a display device and an electronic apparatus having the touch panel.

BACKGROUND

In the related art, there have been techniques in which information is input by the touch of a finger or the like. Among them, as a technique which has particularly attracted attention, there is a display device which can input information in the same manner as a case of pressing a normal button with the finger or the like, by touching various buttons displayed on a display with the finger or the like. This technique enables the display and the buttons to be used in common, and thus brings great merits of space saving or reduction in the number of components.

There are various types of touch panel which detect touch of the finger or the like, and a capacitance type is generally widespread in a device in which multi-point detection is necessary such as a smart phone (for example, refer to JP-A-2011-198207). The capacitance type touch panel includes, for example, a matrix-shaped electrode pattern in the detection surface, and detects a capacitance variation of a position touched by the finger or the like.

SUMMARY

Here, a control circuit which applies an AC signal to the electrode pattern and detects a capacitance variation due to the touch of the finger or the like on a detection surface is connected to the touch panel. The control circuit is electrically connected to the electrode pattern via signal wires provided in a bezel region of the touch panel. Typically, the signal wires are hidden by a light blocking film formed on a cover glass of the touch panel in order to be prevented from being viewed from the outside.

In recent years, the light blocking film has been narrowed according to demands on narrowing of the bezel region of the touch panel. However, if the light blocking film is too narrowed, there is a problem in that the signal wires are viewed from the outside due to joining errors when a wire substrate on which the electrode pattern is formed and the cover glass on which the light blocking film is formed are joined to each other.

It is therefore desirable to provide a touch panel capable of achieving a narrow bezel while hiding signal wires, a manufacturing thereof, and a display device and an electronic apparatus having the touch panel.

An embodiment of the present technology is directed to a touch panel including a wire substrate and a cover substrate joined to each other. The wire substrate includes a sensor electrode; a plurality of signal wires that are electrically connected to the sensor electrode and extend along a circumference of the sensor electrode; and a first light blocking layer that covers at least a signal wire disposed closest to the sensor electrode of the plurality of signal wires. The cover substrate includes a second light blocking layer that faces a continuous region including an outer edge region of the first light blocking layer and a signal wire disposed so as to be the most distant from the sensor electrode.

Another embodiment of the present technology is directed to a display device including an image generation unit that generates an image; a touch panel that is disposed on a surface of the image generation unit; and a control unit that controls the image generation unit and the touch panel. The touch panel included in the display device according to the embodiment of the present technology has the same configuration as the above-described touch panel.

Still another embodiment of the present technology is directed to an electronic apparatus including the above-described display device.

Yet another embodiment of the present technology is directed to a manufacturing method of a touch panel including the following two steps: (A) preparing a wire substrate which includes a sensor electrode, a plurality of signal wires electrically connected to the sensor electrode and extend along a circumference of the sensor electrode, and a first light blocking layer covering at least a signal wire disposed closest to the sensor electrode of the plurality of signal wires, and preparing a cover substrate which includes a second light blocking layer; and (B) joining the wire substrate and the cover substrate to each other such that the second light blocking layer faces a continuous region including an outer edge region of the first light blocking layer and a signal wire disposed so as to be the most distant from the sensor electrode.

In the touch panel, the manufacturing method thereof, the display device, and the electronic apparatus according to the embodiments of the present technology, a plurality of signal wires are hidden by two light blocking layers (the first light blocking layer and the second light blocking layer) which partially overlap each other. Here, the first light blocking layer is disposed relatively closer to the central region of the touch panel than the second light blocking layer and is provided in the wire substrate. For this reason, even if a joining error occurs at a position of the second light blocking layer when the wire substrate and the cover substrate are joined to each other, the error only varies an overlapping extent of the first light blocking layer and the second light blocking layer and thus does not influence the clearance between the first light blocking layer and the sensor electrode or the coat margin of the signal wires by the first light blocking layer. In other words, in the embodiments of the present technology, when the clearance or the coat margin is considered, there is no necessity for taking manufacturing errors when the wire substrate is joined to the cover substrate into consideration. As a result, it is possible to reduce the clearance or the coat margin.

According to the touch panel, the manufacturing method thereof, the display device, and the electronic apparatus according to the embodiments of the present technology, since the light blocking layer (the first light blocking layer) closer to the central region of the two light blocking layers (the first light blocking layer and the second light blocking layer) which partially overlap each other is provided in the wire substrate side, it is possible to reduce the clearance between the first light blocking layer and the sensor electrode or the coat margin of the signal wire by the first light blocking layer. As a result, it is possible to achieve a narrow bezel while hiding the signal wires.

BRIEF DESCRIPTION OF THE DRAWINGS

FIGS. 1A and 1B are diagrams illustrating an operation principle of a touch detection type used in a display device according to an embodiment of the present technology, and are diagrams illustrating a non-touch state.

FIGS. 2A and 2B are diagrams illustrating an operation principle of a touch detection type used in the display device according to the embodiment of the present technology, and diagrams illustrating an example of the waveforms of the driving signal and the detection signal of a touch sensor.

FIGS. 3A and 3B are diagrams illustrating an operation principle of a touch detection type used in the display device according to the embodiment of the present technology, and are diagrams illustrating a state where the finger is touched.

FIG. 4 is a diagram illustrating an example of the cross-sectional configuration of the display device according to the embodiment of the present technology.

DETAILED DESCRIPTION

Figure 5:
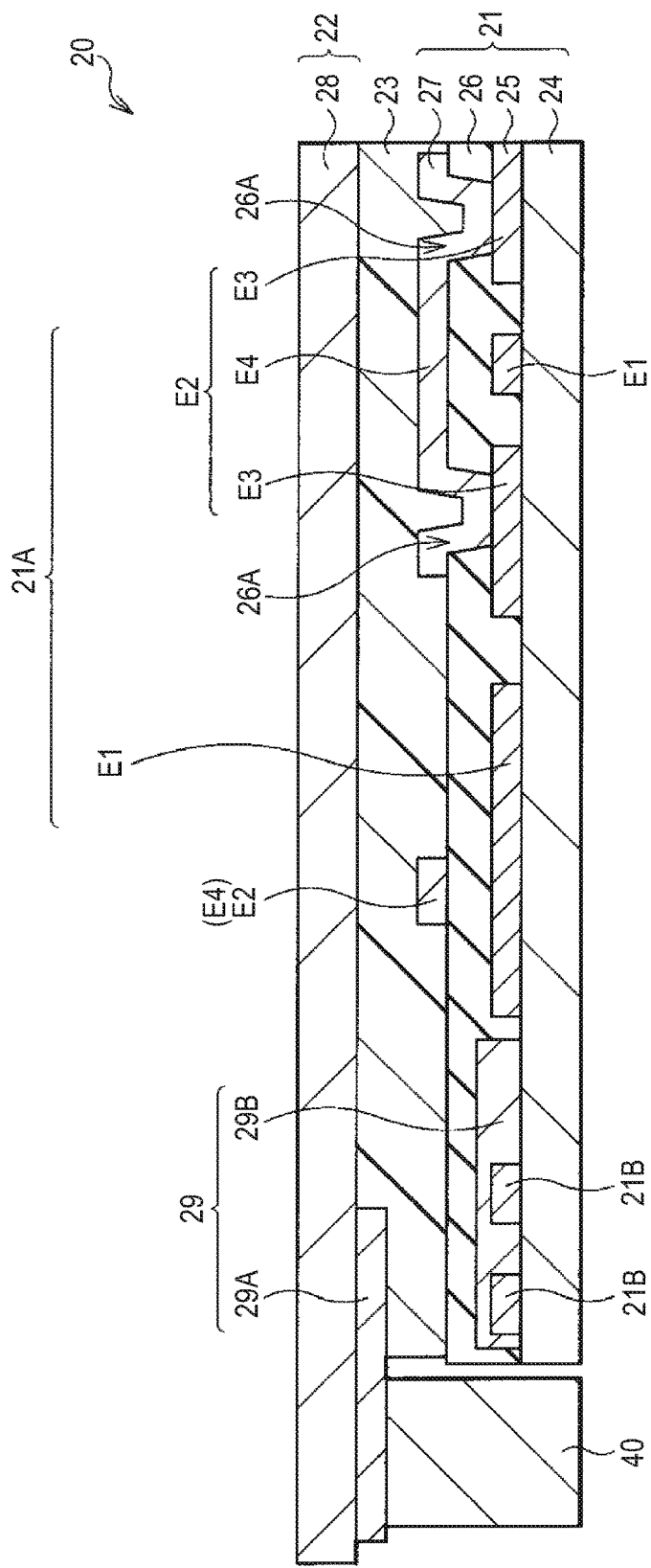
FIG. 5 is a diagram illustrating an example of the cross-sectional configuration of the touch panel of FIG. 4.

Hereinafter, embodiments of the present technology will be described in detail with reference to the accompanying drawings. In addition, the description will be made in the following order.

1. Basic principle of the touch detection type
2. Embodiment
3. Modified examples
4. Application example <1. Basic Principle of Touch Detection Type>

First, a basic principle of a touch detection type used in a display device according to the following embodiment will be described. The touch detection type is implemented by a capacitance type touch sensor. FIG. 1A schematically shows the touch sensor. FIG. 1B shows an equivalent circuit of the touch sensor of FIG. 1A and peripheral circuits connected to the touch sensor. The touch sensor includes a dielectric 101, and a pair of electrodes 102 and 103 disposed opposite to each other with the dielectric 101 interposed therebetween, and is indicated by a capacitive element 104 as shown in FIG. 1B in an equivalent circuit.

One end (the electrode 102) of the capacitive element 104 is connected to an AC signal source 105. The other end (the electrode 103) of the capacitive element 104 is connected to a voltage detection circuit 106, and is connected to a reference potential line 108 via a resistor 107. The AC signal source 105 outputs AC rectangular waves Sg with a predetermined frequency (for example, approximately several kHz to several tens of kHz). The voltage detection circuit 106 detects a peak value of an input signal, and determines the touch and non-touch of the finger on the touch sensor on the basis of the detected voltage. The reference potential line 108 is electrically connected to a member (for example, a ground layer of a printed circuit board or a conductive casing) which gives a potential used as a reference of a circuit operation, for example, in a device which has the touch sensor mounted therein, and has the same potential (reference potential) as the member when being connected to the member. The reference potential is, for example, a ground potential.

In the touch sensor, when the AC rectangular wave Sg (FIG. 2B) is applied to the electrode 102 from the AC signal source 105, an output waveform (a detected signal Vdet) as shown in FIG. 2A appears in the electrode 103.

In a state (FIG. 1A) where an object such as the finger does not touch the touch sensor, as shown in FIG. 1B, a current I0 corresponding to a capacitance value of the capacitive element 104 flows according to the charge and discharge of the capacitive element 104. A potential waveform of the electrode 103 side of the capacitive element 104 at this time becomes, for example, a waveform V0 as shown in FIG. 2A, which is detected by the voltage detection circuit 106.

On the other hand, in a state (FIG. 3A) where an object such as the finger is touched on the touch sensor, as shown in FIG. 3B, a capacitive element 109 formed by the object such as the finger is added in series to the capacitive element 104. In this state, currents I1 and I2 flow according to the charge and discharge of the capacitive elements 104 and 109 respectively. At this time, a potential waveform at the electrode 103 becomes a waveform V1 as shown in FIG. 2A, which is detected by the voltage detection circuit 106. A potential of the electrode 103 is a voltage-divided potential defined by values of the currents I1 and I2 flowing through the capacitive elements 104 and 109. For this reason, the waveform V1 has a smaller value than the waveform V0 in a non-touch state. Thereafter, the detected voltage and a predetermined threshold value Vth are compared by the voltage detection circuit 106, and when the detected voltage is equal to or less than the threshold value Vth, a non-touch state is determined, whereas when the detected voltage is larger than the predetermined threshold value Vth, a touch state is determined. In the above-described way, touch detection is performed. In addition, in the display device according to the following embodiment, detection types different from the above-described type may be used.

<2. Embodiment>

[Configuration]

FIG. 4 shows an example of the cross-sectional configuration of a display device 1 according to the embodiment of the present technology. The display device 1 is a display device with the touch sensor, and includes an image generation unit 10, a capacitance type touch panel 20, and a control unit 30. The touch panel 20 is formed separately from the image generation unit 10, and is disposed on a surface of the image generation unit 10. The control unit 30 controls the image generation unit 10 and the touch panel 20. Specifically, the control unit 30 drives the image generation unit 10 on the basis of an image signal input from an external device, further drives the touch panel 20, and outputs a signal according to a detected signal of the touch panel 20 to the external device.

(Image Generation Unit 10)

The image generation unit 10 generates an image on the basis of a signal input from the control unit 30. The image generation unit 10 includes, for example, a liquid crystal display panel which varies an arrangement of liquid crystal molecules so as to transmit and modulate incident light, thereby generating an image, and a light source which illuminates the liquid crystal display panel from a back side thereof. In addition, the image generation unit 10 may have a configuration different from the above-described configuration, and, may include, for example, an organic EL display panel which generates an image by enabling an organic EL element to emit light.

(Touch Panel 20)

Figure 6:
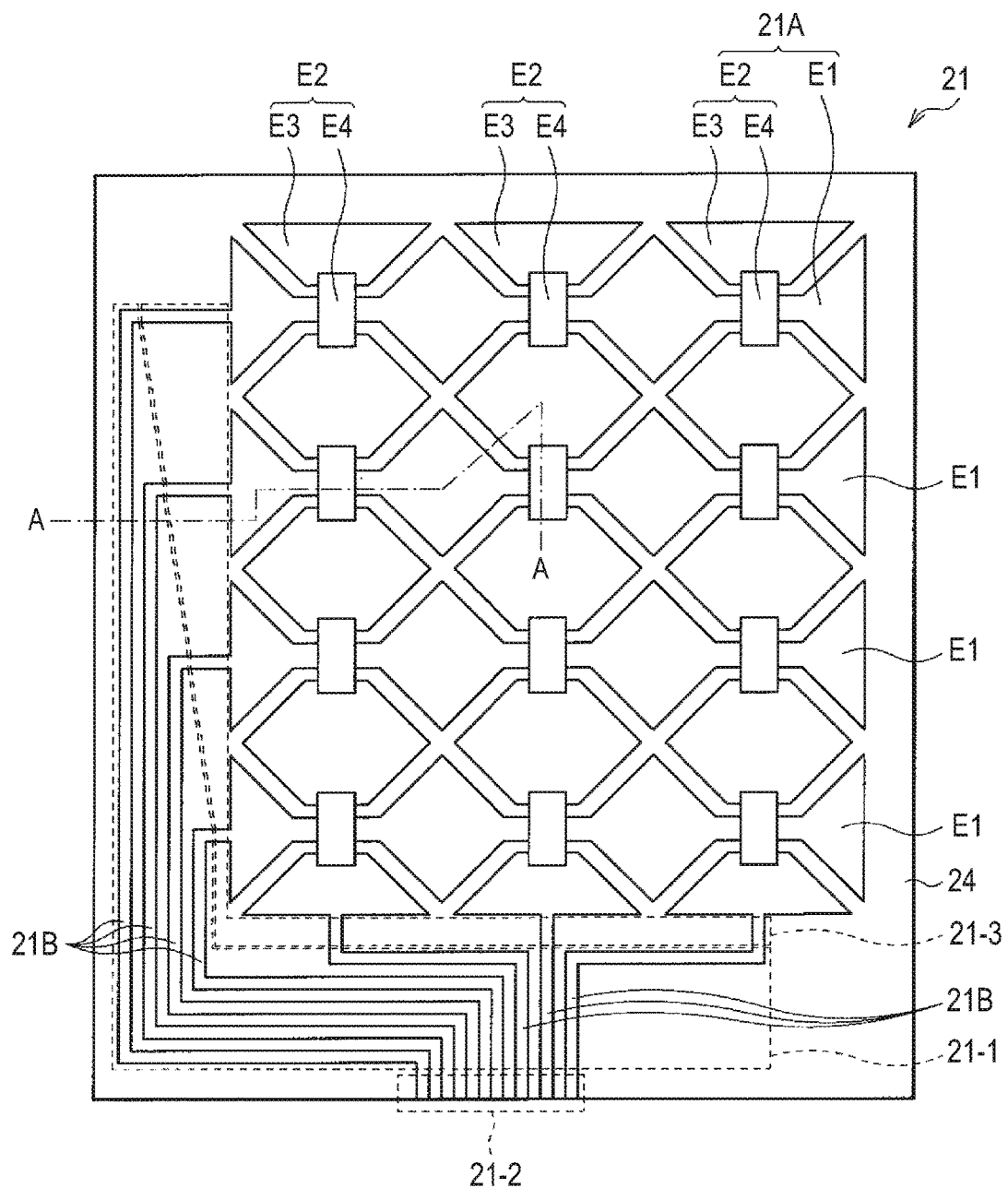
FIG. 6 is a diagram illustrating an example of the layout of the electrode pattern of the touch panel of FIG. 5.

FIG. 5 shows an example of the cross-sectional configuration of the touch panel 20. FIG. 6 shows an example of the layout of the electrode pattern of the touch panel 20. In addition, FIG. 5 shows a cross-sectional configuration of a portion corresponding to the line A-A of FIG. 6 in the touch panel 20.

The touch panel 20 inputs information when the finger or the like is touched on an image display surface (a detection surface of the touch panel 20) of the display device 1. The touch panel 20, for example, corresponds to a specific example of the above-described capacitance type touch sensor, and detects touch and non-touch of the finger or the like on the detection surface by using an XY matrix. The touch panel 20 is joined to, for example, the surface of the image generation unit 10 via an adhesive layer or a sticky layer. The touch panel 20 is joined to the surface of the image generation unit 10 via a sticky layer 40 provided at an outer edge of the touch panel 20 as shown in FIG. 5. Here, the sticky layer 40 includes, for example, a sticky tape.

The touch panel 20 is obtained by joining a wire substrate 21 and a cover substrate 22 via an adhesive layer 23. The wire substrate 21 and the cover substrate 22 are disposed so as to face each other with the adhesive layer 23 interposed therebetween. The wire substrate 21 is obtained by laminating, for example, a first conductive layer 25, a light blocking layer 29B, an insulating layer 26, and a second conductive layer 27 in this order on an upper surface (a surface on the cover substrate 22 side) of a substrate 24. The cover substrate 22 is provided with, for example, a light blocking layer 29A on a lower surface (a surface on the wire substrate 21 side) of a substrate 28. The substrate 24 and the substrate 28 are disposed so as to face each other with the adhesive layer 23 interposed therebetween. The substrate 28 is larger than the substrate 24, and is, for example, one size larger than the substrate 24. In other words, the substrate 28 has a ring-shaped region which does not face the substrate 24. The adhesive layer 23 is obtained by, for example, curing a UV cured resin.

In the present embodiment, light blocking layers included in the touch panel 20 may include two light blocking layers, the light blocking layer 29A and the light blocking layer 29B. Therefore, in FIG. 5, light blocking layers including the light blocking layer 29A and the light blocking layer 29B are indicated by the light blocking layer 29. In addition, the light blocking layer 29A corresponds to a specific example of the "second light blocking layer" of the embodiment of the present technology, and the light blocking layer 29B corresponds to a specific example of the "first light blocking layer" of the embodiment of the present technology. Further, the substrate 24 corresponds to a specific example of the "first insulating substrate" of the embodiment of the present technology, and the substrate 28 corresponds to a specific example of the "second insulating substrate" of the embodiment of the present technology.

The substrate 24 is a substrate on which the first conductive layer 25, the light blocking layer 29B, the insulating layer 26, and the second conductive layer 27 are formed, and holds the first conductive layer 25, the light blocking layer 29B, the insulating layer 26, and the second conductive layer 27. The substrate 24 includes an insulating and translucent member, and, includes, for example, a glass substrate or an insulating and translucent resin film. The substrate 28 is a substrate which forms the detection surface and covers the first conductive layer 25 and the second conductive layer 27. The substrate 28 also holds the light blocking layer 29A. The substrate 28 includes an insulating and translucent member, and, includes, for example, a glass substrate or an insulating and translucent resin film.

The first conductive layer 25 and the second conductive layer 27 are used to detect the touch and non-touch of the finger or the like on the detection surface, and are made of a translucent and conductive material such as, for example, ITO (Indium Tin Oxide). The insulating layer 26 is disposed between the first conductive layer 25 and the second conductive layer 27. The insulating layer 26 is used to insulate and separate first electrodes E1 described later and second electrodes E2 described later from each other, and is made of a translucent and insulating material such as, for example, an epoxy based resin. The insulating layer 26 has contact holes 26A at positions corresponding to both ends of an island-shaped electrode E3 described later. The light blocking layers 29A and 29B are used to prevent a silhouette of a signal wire 21B described later from being viewed on the image display surface, and is made of a light blocking material. A color of the light blocking material is typically black but may be colors (for example, white) other than black.

The first conductive layer 25 and the second conductive layer 27 include a sensor electrode 21A which detects touch and non-touch on the detection surface and a plurality of signal wires 21B which connect the sensor electrode 21A and the control unit 30 to each other. The sensor electrode 21A is disposed at a position corresponding to a portion excluding an outer edge of the upper surface in the wire substrate 21. The signal wires 21B are disposed at a position corresponding to the outer edge in the upper surface of the wire substrate 21 and extend along the circumference of the sensor electrode 21A.

The sensor electrode 21A includes a plurality of first electrodes E1 extending in a predetermined direction and a plurality of second electrodes E2 extending in a direction intersecting (for example, perpendicular to) the first electrodes E1. The first electrodes E1 are constituted by a portion of the first conductive layer 25. In other words, the first conductive layer 25 includes the first electrodes E1. The first electrodes E1 are formed so as to be contacted to the upper surface (the surface on the cover substrate 22 side) of the substrate 24, and are strip-shaped electrodes including a plurality of island-shaped electrodes and connection electrodes connecting two adjacent island-shaped electrodes to each other. Here, the width of the connection electrode is smaller than the width of the island-shaped electrode.

The second electrodes E2 are constituted by a portion of the first conductive layer 25 and the whole or a part of the second conductive layer 27. In other words, the first conductive layer 25 includes the overall first electrodes E1 and some of the second electrodes E2, and the second conductive layer 27 includes some of the second electrodes E2. The second electrodes E2 are strip-shaped electrodes which include a plurality of island-shaped electrodes E3 disposed in the same layer as the first electrodes E1 and relay electrodes E4 which electrically connect two adjacent island-shaped electrodes E3 to each other and cross the first electrodes E1 (specifically, the connection electrodes). In other words, the first conductive layer 25 includes the overall first electrodes E1 and the respective island-shaped electrodes E3, and the second conductive layer 27 includes the relay electrodes E4. Here, the width of the relay electrode E4 is smaller than the width of the island-shaped electrode E3. In addition, the island-shaped electrodes E3 and the island-shaped electrodes of the first electrodes E1 have a delta arrangement.

The relay electrodes E4 have a strip shape extending in the extending direction of the second electrodes E2. In the relay electrode E4, one end thereof is connected to the island-shaped electrode E3 and the other end thereof is connected to another island-shaped electrode E3, and a portion crossing over the first electrode E1 is disposed in a further upper layer than the first electrode E1. The "further upper layer than the first electrode E1" indicates a layer coming into contact with the upper surface of the insulating layer 26, and, specifically, indicates the second conductive layer 27. Therefore, the relay electrodes E4 are disposed so as to be closer to the substrate 28 than the island-shaped electrodes E3. The relay electrodes E4 are collectively formed in manufacturing procedures, and thus are formed of a single layer. On the other hand, the island-shaped electrodes E3 are formed along with the first electrodes E1 in the same manufacturing procedure, and thus the island-shaped electrodes E3 and the first electrodes E1 are made of the same material.

Portions of both ends of the relay electrode E4 in the longitudinal direction are disposed in the contact holes 26A of the insulating layer 26. In other words, the insulating layer 26 has the contact holes 26A at the positions corresponding to both ends of the relay electrode E4 in the longitudinal direction. The contact holes 26A are disposed at positions where the upper surfaces of the island-shaped electrodes E3 are exposed inside the bottom surfaces of the contact holes 26A. Therefore, the relay electrode E4 comes into contact with the portions exposed inside the contact holes 26A of the island-shaped electrodes E3 and is insulated and separated from the first electrodes E1 by the insulating layer 26.

The respective signal wires 21B are electrically connected to the sensor electrode 21A, and extend along the circumference of the sensor electrode 21A. Some signal wires 21B of a plurality of signal wires 21B are electrically connected to the first electrodes E1, and the signal wires 21B which are not connected to the first electrodes E1 of the plurality of signal wires 21B are electrically connected to the second electrodes E2. Each of the signal wires 21B includes a first wire 21-1 extending along the circumference of the sensor electrode 21A, an external connection terminal 21-2 connected to one end of the first wire 21-1, and a second wire 21-3 connected to the other end of the first wire 21-1 and the sensor electrode 21A.

Figure 7:
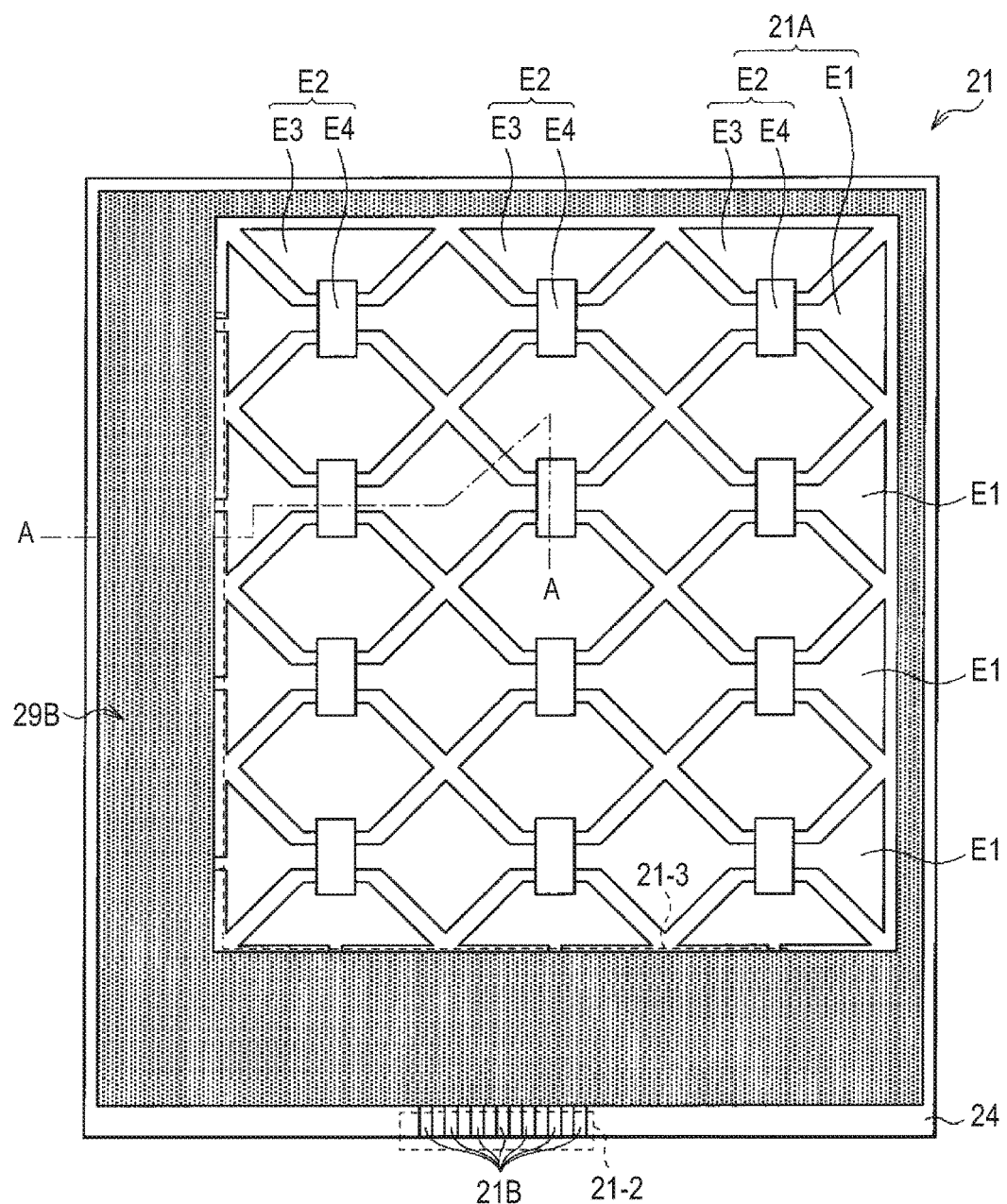
FIG. 7 is a diagram illustrating an example of the layout of the electrode pattern and the light blocking layer of the touch panel of FIG. 5.
Figure 8:
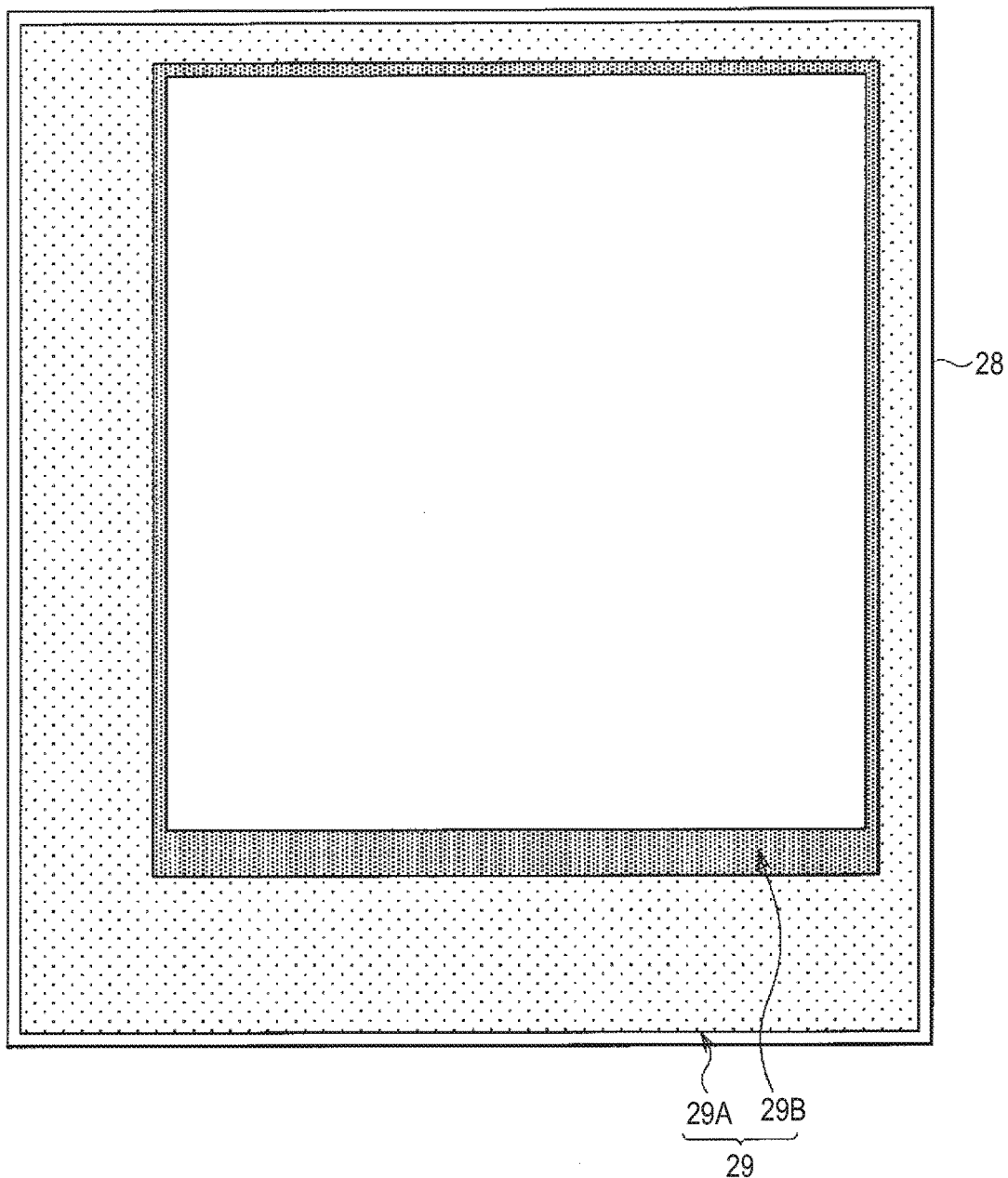
FIG. 8 is a diagram illustrating an example of the layout of two light blocking layers in the touch panel of FIG. 5.

FIG. 7 shows an example of the layout of the electrode pattern and the light blocking layer 29B of the touch panel 20. FIG. 8 shows an example of the layout of the light blocking layers 29A and 29B. In the present embodiment, the light blocking layer 29B covers all the signal wires 21B. In addition, the light blocking layer 29B covers at least the first wires 21-1 of the first wires 21-1 and the second wires 21-3. Further, FIG. 7 exemplifies a case where the light blocking layer 29B covers both the first wires 21-1 and the second wires 21-3. As shown in FIG. 7, the light blocking layer 29B may directly come into contact with the signal wires 21B, or, although not shown, may cover the signal wires 21B via a certain insulating layer.

The light blocking layer 29A is formed so as to face a continuous region including the outer edge region of the light blocking layer 29B and the signal wire 21B which is disposed so as to be the most distant from the sensor electrode 21A. The light blocking layer 29A is also formed in a region which does not face the substrate 24. That is to say, the light blocking layer 29A and the light blocking layer 29B are disposed so as to partially overlap each other, and the light blocking layer 29B is disposed relatively closer to the central region (that is, the sensor electrode 21A set) of the touch panel 20 than the light blocking layer 29A.

Here, as described above, the light blocking layer 29B is provided in the wire substrate 21. Therefore, there is no joining error which may occur when the wire substrate 21 is joined to the cover substrate 22 at the position of the light blocking layer 29B relative to the sensor electrode 21A and the position of the light blocking layer 29B relative to the signal wires 21B. On the other hand, the light blocking layer 29A is provided in the cover substrate 22. Therefore, there may be the above-described joining error at the position of the light blocking layer 29A relative to the sensor electrode 21A and the position of the light blocking layer 29A relative to the signal wires 21B. Of course, even if there is the above-described joining error at the position of the light blocking layer 29A relative to the sensor electrode 21A and the position of the light blocking layer 29A relative to the signal wires 21B, the error only varies an overlapping extent of the light blocking layer 29A and the light blocking layer 29B. Therefore, the above-described joining error does not influence the clearance between the light blocking layer 29B and the sensor electrode 21A and the coat margin of the signal wires 21B by the light blocking layer 29B. That is to say, when the clearance or the coat margin is considered, there is no necessity for taking manufacturing errors when the wire substrate 21 is joined to the cover substrate 22 into consideration. Therefore, it is possible to reduce the clearance or the coat margin as compared with a case where the light blocking layer 29B is not provided.

The light blocking layer 29A and the light blocking layer 29B are formed using, for example, screen printing or offset printing. The light blocking layer 29B is preferably formed using photolithography in consideration of dimensional accuracy. In a case where the light blocking layer 29B is formed using photolithography, the clearance or the coat margin can be further reduced.

[Manufacturing method]

Figure 9:
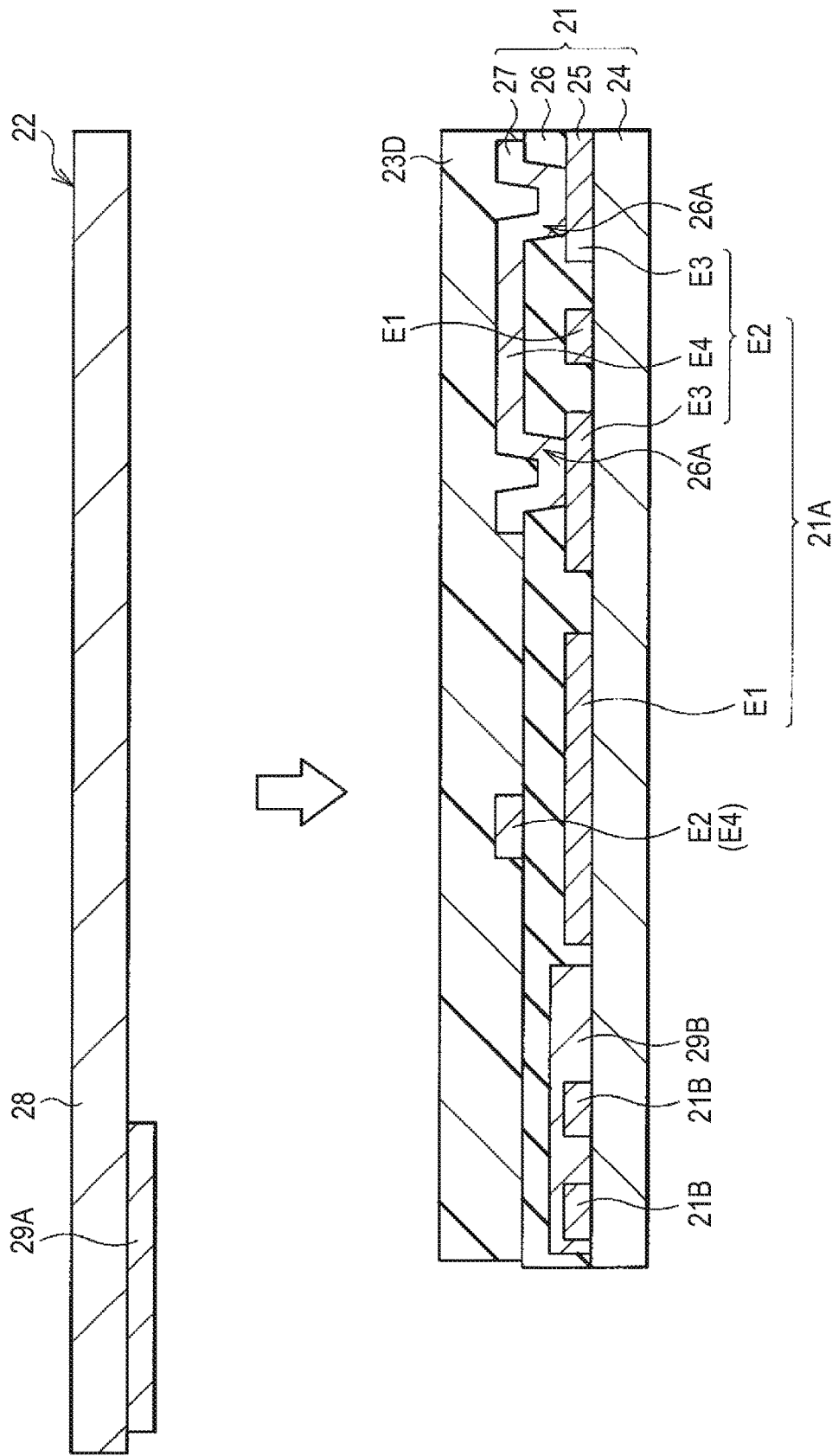
FIG. 9 is a diagram illustrating an example of the manufacturing method of the display device having the touch panel of FIG. 5.

Next, an example of the manufacturing method of the display device 1 according to the present embodiment will be described. First, the wire substrate 21 provided with the sensor electrode 21A, a plurality of signal wires 21B, and the light blocking layer 29B is prepared, and the cover substrate 22 provided with the light blocking layer 29A is prepared. At this time, for example, as shown in FIG. 9, an ultraviolet cured resin 23D is applied on the wire substrate 21. Next, as shown in FIG. 9, the wire substrate 21 and the cover substrate 22 are joined to each other via the ultraviolet cured resin 23D. At this time, the wire substrate 21 and the cover substrate 22 are joined to each other such that the light blocking layer 29A faces a continuous region including the outer edge region of the light blocking layer 29B and the signal wire 21B which is disposed so as to be the most distant from the sensor electrode 21A (refer to FIG. 10).

Figure 10:
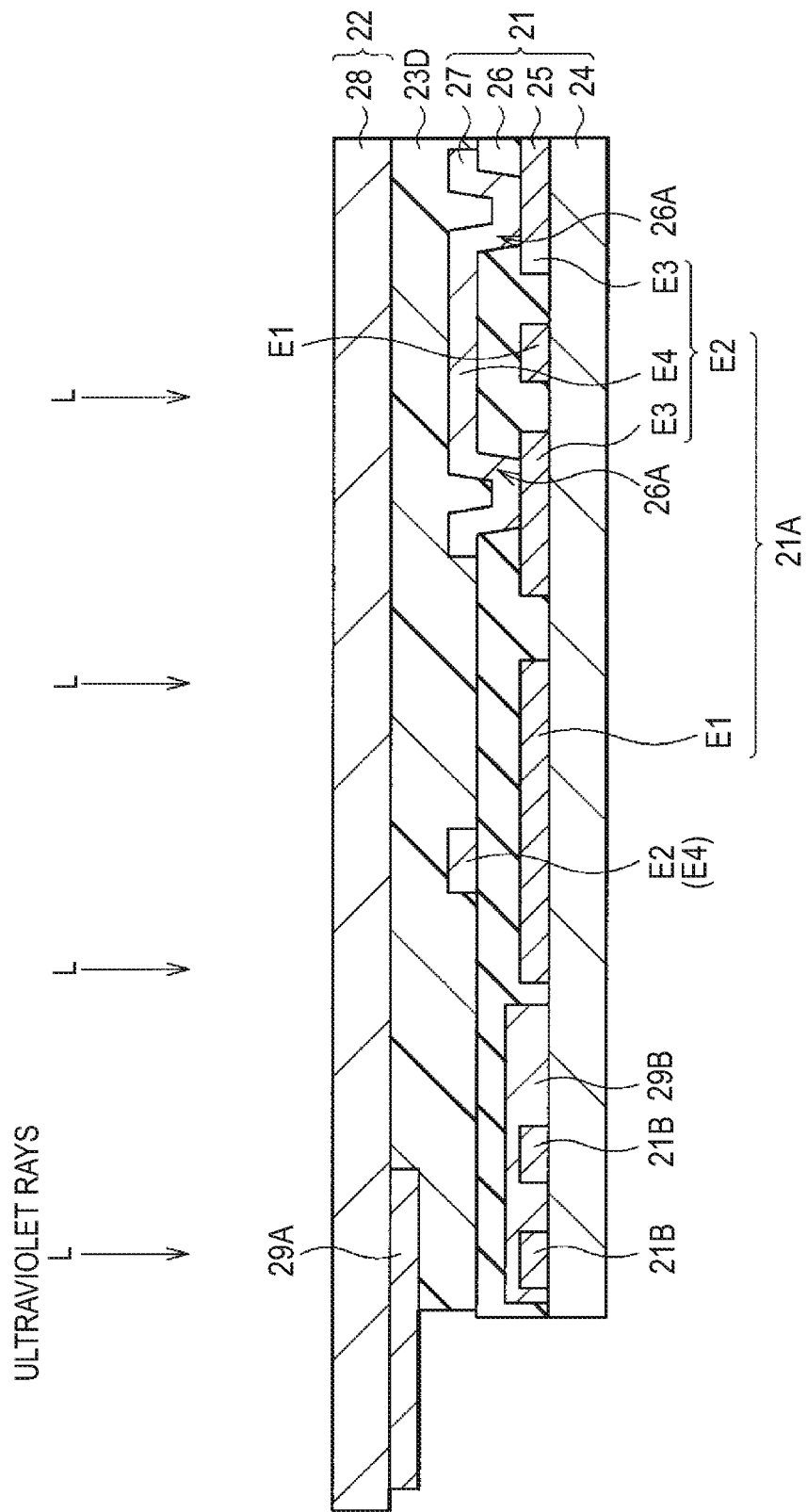
FIG. 10 is a diagram illustrating a step subsequent to FIG. 9.
Figure 11:
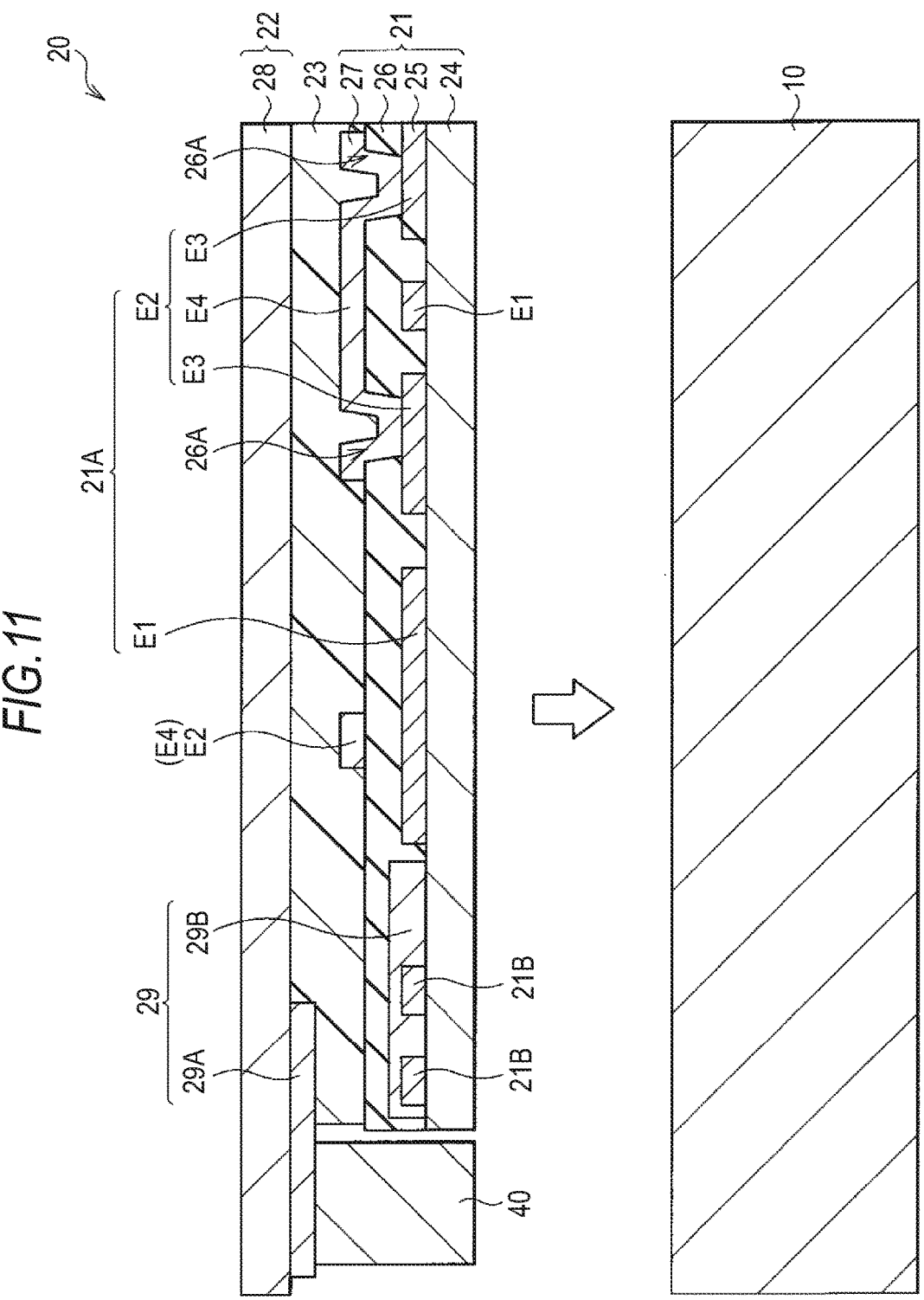
FIG. 11 is a diagram illustrating a step subsequent to FIG. 10.

Next, for example, as shown in FIG. 10, ultraviolet rays L are applied from the cover substrate 22 side so as to cure the ultraviolet cured resin 23D. Thereby, the wire substrate 21 and the cover substrate 22 are fixed to each other by the adhesive layer 23. In this way, the touch panel 20 is completed. Next, for example, as shown in FIG. 11, the sticky layer 40 is provided on the outer edge (a portion which is not coated by the adhesive layer 23 in the light blocking layer 29A) of the touch panel 20, and then the touch panel 20 and the image generation unit 10 are joined to each other via the sticky layer 40. Thereafter, although not shown, the control unit 30 is connected to the touch panel 20 and the image generation unit 10. In this way, the display device 1 is completed.

[Operation]

Next, a description will be made of an example of the operation of the display device 1 according to the present embodiment. First, for example, the display device 1 is powered on, and thereby the control unit 30 starts an operation of the touch panel 20. The control unit 30 first selects one or a plurality of electrodes (the first electrodes E1 and the second electrodes E2) included in the sensor electrode 21A, and applies an AC signal to the selected electrodes. At this time, if the finger or the like is touched on the detection surface, the control unit 30 detects a capacitance variation occurring in the sensor electrode 21A due to the touch of the finger or like on the detection surface as a variation in an output voltage. The control unit 30 derives the touch coordinates of the finger or the like on the basis of the information on the detected output voltage (or the variation in the output voltage). The control unit 30 outputs the derived information on the touch coordinates of the finger or the like to an external device.

[Effects]

Next, effects of the display device 1 according to the present embodiment will be described. In the present embodiment, a plurality of signal wires 21B are hidden by the two light blocking layers 29A and 29B which partially overlap each other. Here, the light blocking layer 29B is disposed relatively closer to the central region of the touch panel 20 than the light blocking layer 29A and is provided in the wire substrate 21. For this reason, even if a joining error occurs at a position of the light blocking layer 29A when the wire substrate 21 and the cover substrate 22 are joined to each other, the error only varies an overlapping extent of the light blocking layer 29A and the light blocking layer 29B and thus does not influence the clearance between the light blocking layer 29B and the sensor electrode 21A or the coat margin of the signal wires 21B by the light blocking layer 29B. In other words, in the present embodiment, when the clearance or the coat margin is considered, there is no necessity for taking manufacturing errors when the wire substrate 21 is joined to the cover substrate 22 into consideration. As a result, it is possible to reduce the clearance or the coat margin.

As such, in the present embodiment, since the light blocking layer 29B closer to the central region of the two light blocking layers 29A and 29B which partially overlap each other is provided in the wire substrate 21, it is possible to reduce the clearance or the coat margin. As a result, it is possible to achieve a narrow bezel while hiding the signal wires 21B.

<3. Modified Examples>

As above, the embodiment of the present technology has been described, but the present technology is not limited to the embodiment and may be variously modified.

First Modified Example

Figure 12:
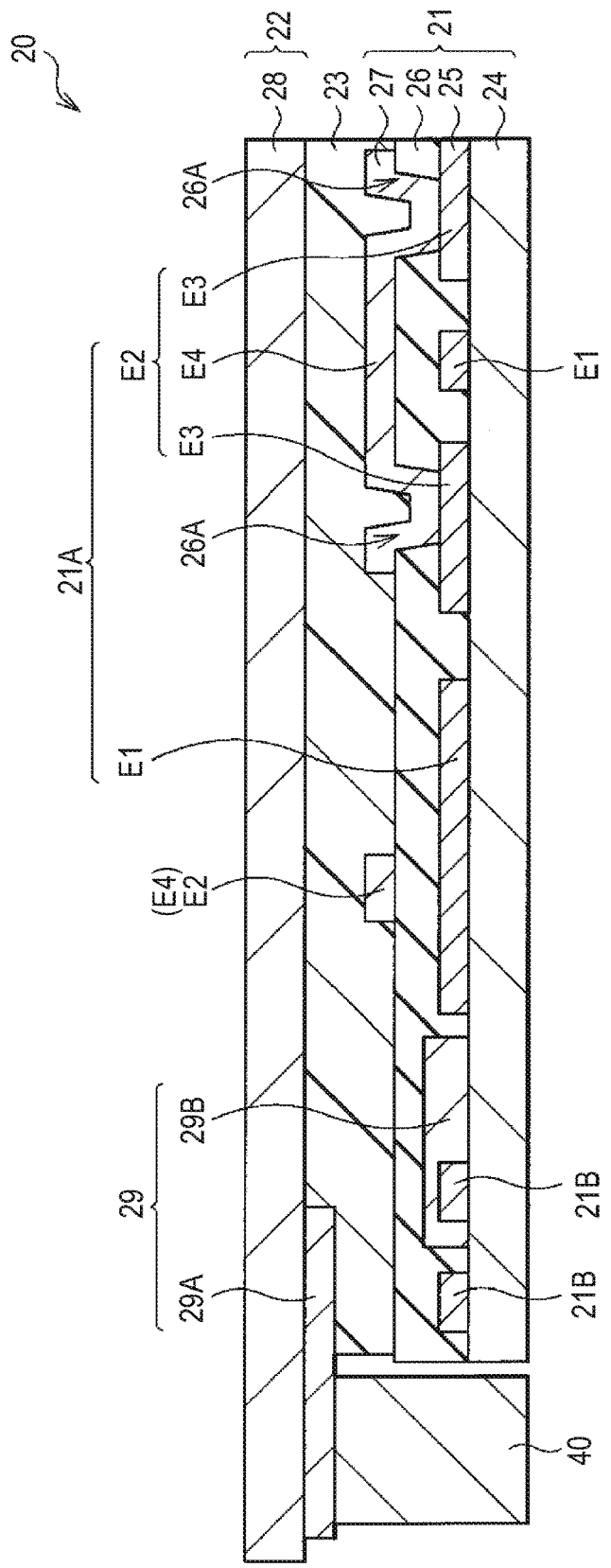
FIG. 12 is a diagram illustrating another example of the cross-sectional configuration of the touch panel of FIG. 4.
Figure 13:
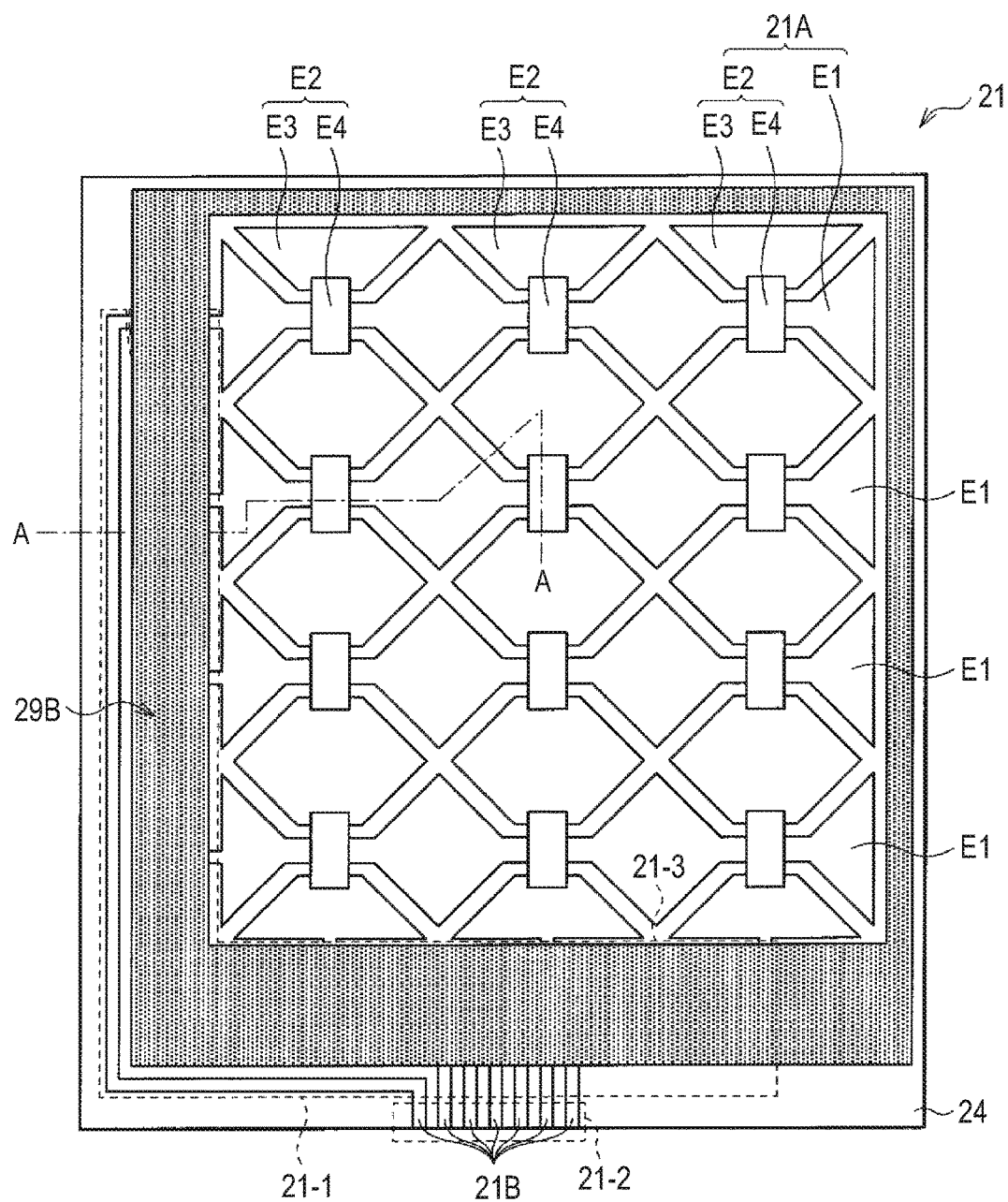
FIG. 13 is a diagram illustrating an example of the electrode pattern of the touch panel and the layout of the light blocking layers of FIG. 12.

For example, although, in the above-described embodiment, the light blocking layer 29B covers all the signal wires 21B, the light blocking layer 29B may cover at least the signal wires 21B disposed closest to the sensor electrode 21A of a plurality of signal wires 21B. For example, as shown in FIGS. 12 and 13, the light blocking layer 29B may cover all the signal wires 21B excluding the signal wire 21B which is disposed so as to be the most distant from the sensor electrode 21A of the plurality of signal wires 21B. However, in the present modified example, it is necessary for a silhouette of the signal wire 21B which is not covered by the light blocking layer 29B not to be viewed from the outside. Specifically, it is at least necessary for the light blocking layer 29A to be disposed so as to face a continuous region including the outer edge region of the light blocking layer 29B and the signal wire 21B which is disposed so as to be the most distant from the sensor electrode 21A. The light blocking layer 29A is preferably formed also in the region which does not face the substrate 24. In addition, the display device 1 according to the present modified example can be manufactured according to the same method as the method disclosed with reference to FIGS. 9 to 11.

Second Modified Example

Although, in the above-described embodiment and first modified example, the substrate 24 is provided in the wire substrate 21, a translucent and insulating layer (first insulating layer) may be provided instead of the substrate 24. In addition, although, in the above-described embodiment and first modified example, the substrate 28 is provided in the cover substrate 22, a translucent and insulating layer (second insulating layer) may be provided instead of the substrate 28.

Third Modified Example

Although, in the above-described embodiment, a case where the touch panel 20 is joined to the surface of the image generation unit 10 via an adhesive layer or a sticky layer has been exemplified, the touch panel 20 may be supported by a casing (not shown) of the display device 1. In this case, the touch panel 20 may be joined to the casing of the display device 1 via, for example, the sticky layer 40. In a case where the touch panel 20 is joined to the casing via the sticky layer 40, in the manufacturing method in the embodiment, the touch panel 20 may be joined to the casing of the display device 1 instead of being joined to the surface of the image generation unit 10.

<4. Application Example>

Figure 14:
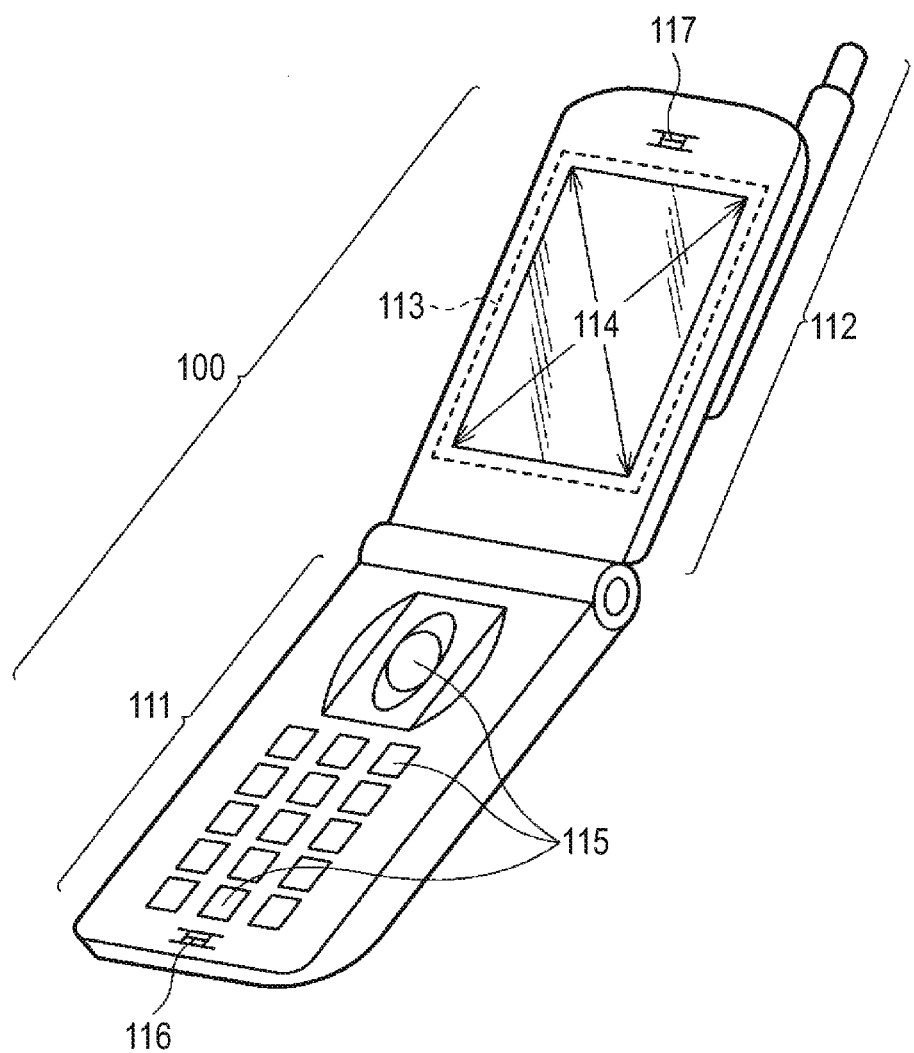
FIG. 14 is a diagram illustrating an example of the schematic configuration of an electronic apparatus according to an application example.

Next, an application example of the display device 1 related to the above-described embodiment and modified examples will be described. FIG. 14 is a perspective view illustrating an example of the schematic configuration of an electronic apparatus 100 according to the application example. The electronic apparatus 100 is a mobile phone, and, for example, as shown in FIG. 14, includes a main body unit 111 and a display body unit 112 which can be opened and closed with respect to the main body unit 111. The main body unit 111 has operation buttons 115 and a transmission portion 116. The display body unit 112 has a display device 113 and a reception portion 117. The display device 113 performs a variety of displays regarding telephone communication on a display screen 114 of the display device 113. The electronic apparatus 100 includes a control unit (not shown) for controlling an operation of the display device 113. The control unit is provided as a part of a controller controlling the entire electronic apparatus 100, or is provided inside the main body unit 111 or the display body unit 112 separately from the controller.

The display device 113 has the same configuration as the display device 1 according to the above-described embodiment and modified examples thereof. Thereby, it is possible to reduce the bezel of the display device 1, and thus it is possible to expand the image display surface or to miniaturize the electronic apparatus 100 just as much as reducing the bezel of the display device 1.

In addition, electronic apparatuses which may employ the display device 1 according to the above-described embodiment and modified examples thereof may include not only the above-described mobile phone, but also a personal computer, a liquid crystal television, a view finder type or a monitor direct-view type video tape recorder, a car navigation apparatus, a pager, an electronic notebook, a calculator, a word processor, a workstation, a television telephone set, a POS terminal, and the like.

Further, for example, the present technology may be implemented as the following configurations.

(1) A touch panel including a wire substrate and a cover substrate joined to each other, wherein the wire substrate includes a sensor electrode; a plurality of signal wires that are electrically connected to the sensor electrode and extend along a circumference of the sensor electrode; and a first light blocking layer that covers at least a signal wire disposed closest to the sensor electrode of the plurality of signal wires, and wherein the cover substrate includes a second light blocking layer that faces a continuous region including an outer edge region of the first light blocking layer and a signal wire disposed so as to be the most distant from the sensor electrode.

(2) The touch panel set forth in (1), wherein each of the signal wires includes a first wire extending along the circumference of the sensor electrode; an external connection terminal connected to one end of the first wire; and a second wire connected to the other end of the first wire and the sensor electrode, and wherein the first light blocking layer covers at least the first wire of the first wire and the second wire.

(3) The touch panel set forth in (1) or (2), wherein the wire substrate and the cover substrate are joined to each other via an adhesive layer.

(4) The touch panel set forth in any one of (1) to (3), wherein the wire substrate has a first insulating substrate or a first insulating layer that holds the sensor electrode, the plurality of signal wires, and the first light blocking layer, wherein the cover substrate has a second insulating substrate or a second insulating layer that holds the second light blocking layer, and wherein the first insulating substrate or the first insulating layer and the second insulating substrate or the second insulating layer face each other with the sensor electrode, the plurality of single wires, the first light blocking layer, and the second light blocking layer interposed therebetween.

(5) The touch panel set forth in (4), wherein the second insulating substrate or the second insulating layer has a size larger than the first insulating substrate or the first insulating layer, and wherein the second light blocking layer is also formed in a region which does not face the first insulating substrate or the first insulating layer.

(6) A display device including an image generation unit that generates an image; a touch panel that is disposed on a surface of the image generation unit; and a control unit that controls the image generation unit and the touch panel, wherein the touch panel includes a wire substrate and a cover substrate joined to each other, wherein the wire substrate includes a sensor electrode; a plurality of signal wires that are electrically connected to the sensor electrode and extend along a circumference of the sensor electrode; and a first light blocking layer that covers at least a signal wire disposed closest to the sensor electrode of the plurality of signal wires, and wherein the cover substrate includes a second light blocking layer that faces a continuous region including an outer edge region of the first light blocking layer and a signal wire disposed so as to be the most distant from the sensor electrode.

(7) An electronic apparatus including a display device, wherein the display device includes an image generation unit that generates an image; a touch panel that is disposed on a surface of the image generation unit; and a control unit that controls the image generation unit and the touch panel, wherein the touch panel includes a wire substrate and a cover substrate joined to each other, wherein the wire substrate includes a sensor electrode; a plurality of signal wires that are electrically connected to the sensor electrode and extend along a circumference of the sensor electrode; and a first light blocking layer that covers at least a signal wire disposed closest to the sensor electrode of the plurality of signal wires, and wherein the cover substrate includes a second light blocking layer that faces a continuous region including an outer edge region of the first light blocking layer and a signal wire disposed so as to be the most distant from the sensor electrode.

(8) A manufacturing method of a touch panel including preparing a wire substrate which includes a sensor electrode, a plurality of signal wires electrically connected to the sensor electrode and extend along a circumference of the sensor electrode, and a first light blocking layer covering at least a signal wire disposed closest to the sensor electrode of the plurality of signal wires, and preparing a cover substrate which includes a second light blocking layer; and joining the wire substrate and the cover substrate to each other such that the second light blocking layer faces a continuous region including an outer edge region of the first light blocking layer and a signal wire disposed so as to be the most distant from the sensor electrode.

The present disclosure contains subject matter related to that disclosed in Japanese Priority Patent Application JP 2012-012398 filed in the Japan Patent Office on Jan. 24, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
   a substrate;
   a sensor electrode in a sensor area;
   a plurality of signal wires that are disposed on the substrate and electrically connected to the sensor electrode and an external connection terminal, the plurality of signal wires extends along a circumference of the sensor area, each of the plurality of signal wires including
      a first wire portion including a first end, a second end, and a parallel portion, the first end is connected to the external connection terminal, the parallel portion extends parallel to the circumference of the sensor area, and
      a second wire portion including a first end and a second end, the first end is connected to the second end of the first wire portion, and the second end is connected to the sensor electrode;
   an inner light blocking layer that overlaps the parallel portions of the plurality of signal wires, the inner light blocking layer having an outer edge and an inner edge relative to a center of the display device; and
   an outer light blocking layer that overlaps the parallel portions of the plurality of signal wires and all of the outer edge of the inner blocking layer, in a plan view that is perpendicular to the substrate,
   wherein the inner light blocking layer is not in direct contact with the outer light blocking layer.

2. The display device according to claim 1, further comprising;
   an image generation unit configured to generate an in image;
   a touch panel that is disposed on a surface of the image generation unit; and
   a control unit configured to control the image generation unit and touch panel.

3. The display device according to claim 1, wherein the sensor electrode includes
   a plurality of drive electrodes, and
   a plurality of detection electrodes that transverse the plurality of drive electrodes, wherein
      each signal wire of the plurality of signal wires is coupled with a corresponding drive electrode of the plurality of drive electrodes and a corresponding detection electrode of the plurality of detection electrodes.

4. A display device comprising:
   a substrate;
   a sensor electrode in a sensor area;
   a plurality of signal wires disposed on the substrate, each of the plurality of signal wires extends along a circumference of the sensor area and includes a first wire portion including a first end, a second end, and a parallel portion, the first end is connected to an external connection terminal, and the parallel porting extends parallel to the circumference of the sensor area;
   an inner light blocking layer that overlaps the parallel portions of the plurality of signal wires, the inner light blocking layer having an outer edge and an inner edge relative to a center of the display device; and
   an outer light blocking layer that overlaps the parallel portions of the plurality of signal wires and all of the outer edge of the inner light blocking layer, in a plan view that is perpendicular to the substrate,
   wherein the plurality of signal wires, the inner light blocking layer, and the outer light blocking layer are sequentially stacked, and
   wherein the inner light blocking layer is not in direct contact with the outer light blocking layer.

5. The display device according to claim 4, further comprising;
   an image generation unit configured to generate an in image;
   a touch panel that is disposed on a surface of the image generation unit; and
   a control unit configured to control the image generation unit and touch panel.

6. The display device according to claim 4, wherein the sensor electrode includes
   a plurality of drive electrodes, and
   a plurality of detection electrodes that transverse the plurality of drive electrodes, wherein
      each signal wire of the plurality of signal wires is coupled with a corresponding drive electrode of the plurality of drive electrodes and a corresponding detection electrode of the plurality of detection electrodes.

7. The display device according to claim 1, wherein
   the outer light blocking layer has an outer portion and an inner portion relative to the center of the display device, and
   the outer portion of the outer light blocking layer extends outwardly further than the outer edge of the inner light blocking layer.

* * * * *